US006196511B1

(12) United States Patent
Beauchemin

(10) Patent No.: US 6,196,511 B1
(45) Date of Patent: Mar. 6, 2001

(54) PORTABLE HOOK HANGING SYSTEM FOR ATTACHMENT TO VERTICAL OBJECTS

(76) Inventor: David G. Beauchemin, 1312 W. Bell, Houston, TX (US) 77019

( * ) Notice: Subject to any disclaimer, the term of this patent is extended or adjusted under 35 U.S.C. 154(b) by 0 days.

(21) Appl. No.: 09/203,244

(22) Filed: Dec. 1, 1998

Related U.S. Application Data

(63) Continuation-in-part of application No. 29/081,197, filed on Dec. 24, 1997, now Pat. No. Des. 401,838.

(51) Int. Cl.[7] ........................................... F16B 45/00
(52) U.S. Cl. ..................... 248/328; 248/218.4; 248/339
(58) Field of Search ............................ 248/218.4, 301, 248/304, 317, 339, 328, 230.8, 219.4, 255, 538; D8/373

(56) References Cited

U.S. PATENT DOCUMENTS

| D. 401,838 | * | 12/1998 | Beauchemin | D8/373 |
|---|---|---|---|---|
| 561,664 | * | 6/1896 | Hollister | 248/230.8 |
| 1,342,626 | * | 6/1920 | Frank | 248/230.8 |
| 1,506,668 | * | 8/1924 | Rose et al. | 248/230.8 |
| 3,009,612 | | 11/1961 | Fischett | 224/5 |
| 3,164,343 | | 1/1965 | Cucullo | 248/27.8 |
| 4,220,306 | * | 9/1980 | Cueto et al. | 248/328 |
| 4,405,110 | * | 9/1983 | Gibbons | D8/373 |
| 4,744,537 | | 5/1988 | Buckley | 248/219.1 |
| 5,077,850 | * | 1/1992 | Brubaker | 248/301 |
| 5,301,911 | * | 4/1994 | Beauchemin | 248/218.4 |
| 5,310,151 | * | 5/1994 | Engel | 248/219.4 |
| 5,427,344 | * | 6/1995 | Beauchemin | 248/218.4 |
| 5,482,242 | * | 1/1996 | Jegelius | 248/301 |
| 5,507,545 | * | 4/1996 | Krysiak | 248/304 |

* cited by examiner

Primary Examiner—Ramon O. Ramirez
Assistant Examiner—Jon Szumny
(74) Attorney, Agent, or Firm—Kenneth A. Roddy

(57) ABSTRACT

A portable hook hanging system particularly useful for campers and backpackers includes one or more hook elements that are releasably connected to a generally vertical object, such as a tree trunk, by a flexible cord or belt for hanging and supporting various articles. In a preferred embodiment, a plurality of hooks along with a rod and several lengths of cord are supplied in a kit and a flexible belt may also be supplied in the kit. Each hook has a generally H-shaped main body portion with first and second U-shaped recess extending transversely across the main body portion with the openings of the U-shaped recesses facing in vertically opposed directions. A flat rectangular tang portion and a flat leg portion are formed on a back side of the main body portion and a vertical slot is formed between the tang portion and main body portion which receives the cord or belt. Shallow slots formed in the inwardly curved surfaces of the U-shaped recesses allow the hook to be connected to the vertical object using a cord. Apertures are formed through the main body portion and leg portion for receiving a cord or the rod. When the hooks are secured, the tang portion and leg portion are firmly engaged against the exterior surface of the vertical object, and the main body portion with the U-shaped recesses is disposed closely adjacent to the vertical object such that various articles may be hung and supported therefrom. The rod is inserted into the apertures for supporting a lantern or other article at its outer end.

7 Claims, 5 Drawing Sheets

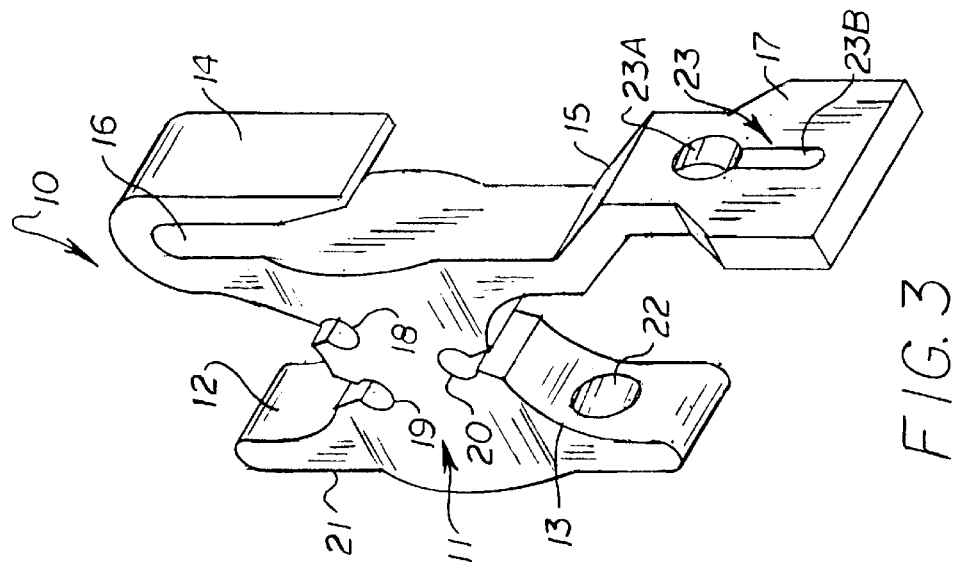
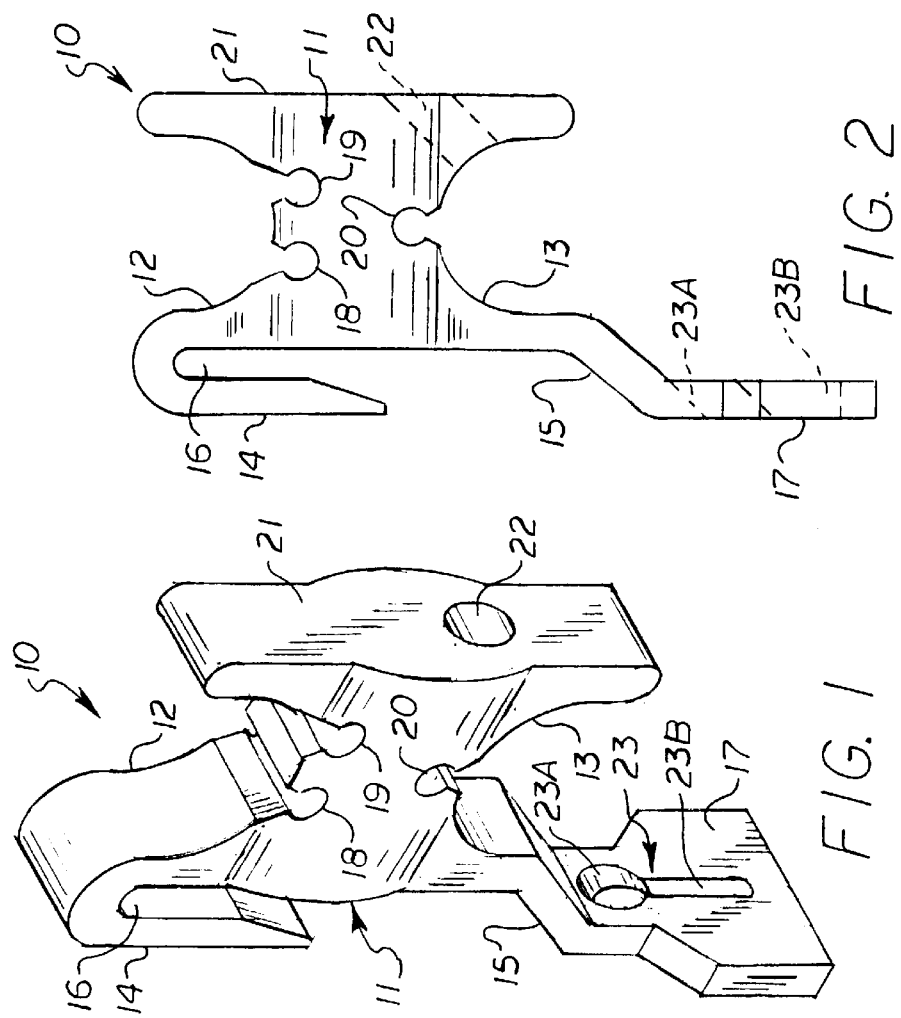

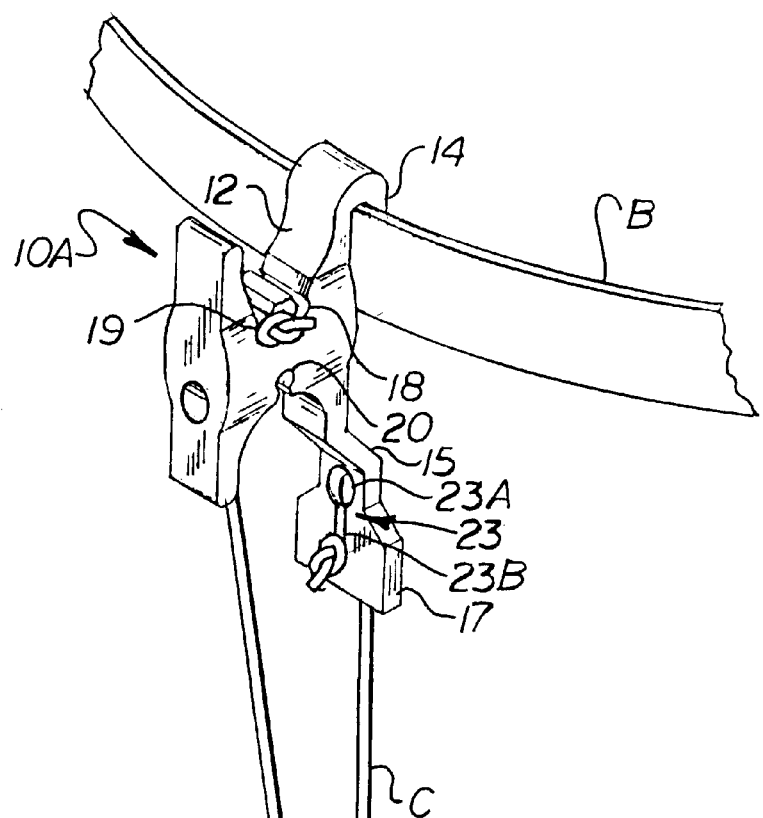
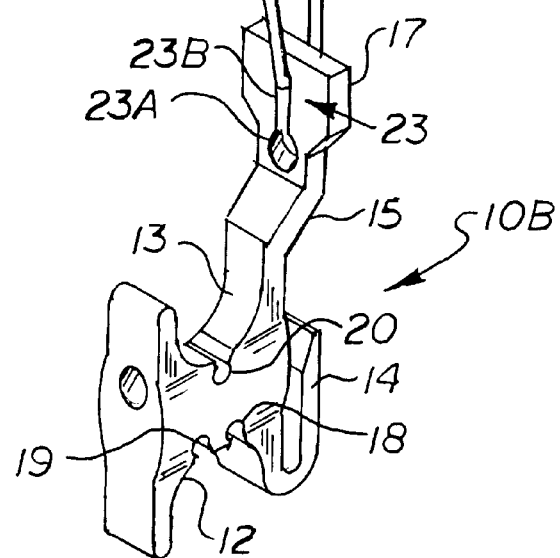
FIG. 7

PORTABLE HOOK HANGING SYSTEM FOR ATTACHMENT TO VERTICAL OBJECTS

CROSS-REFERENCE TO RELATED APPLICATION

This application is a Continuation-In-Part of U.S. Design patent application Ser. No. 29/081,197 filed Dec. 24,1997 is now Des. 401,838, pending.

BACKGROUND OF THE INVENTION

1. Field of the Invention

This invention relates generally to hanging devices, and more particularly to a portable hook hanging system particularly useful for campers and backpackers that includes one or more hook elements that are releasably connected to a generally vertical object, such as a tree trunk, by a flexible cord or belt for hanging and supporting various articles from the hook elements.

2. Brief Description of the Prior Art

A common problem when camping, backpacking, or picnicking out of doors, is that there is no convenient means of hanging or storing gear and the variety of loose articles associated with such endeavors. It is often desirable to hang lanterns for optimum light, and place some articles above the ground to allow them to dry or to prevent animals from gaining access to them.

Usually, if a picnic table is available, the table top serves as the storage area and is quickly cluttered with various items. Some campers will drape wet clothing over their tent to dry, and others will tie a clothesline between two trees. Many campers will drive a nail into a tree to hang articles, such as lanterns and water bags which causes harm to the tree and is a safety hazard to other campers unaware of the nail sticking out of the tree.

Thus, a longfelt need exists for a portable hanging system that can be carried in a compact stored condition and quickly and easily installed on a tree trunk or other vertical object which will allow a wide variety of articles to be suspended and supported above the ground.

There are several patents which disclose various hanging devices which encircle a vertical member and support other objects.

Fischett, U.S. Pat. No. 3,009,612 discloses a fishing harness which is strapped around the waist of the user and has a socket or cup for bracing a fishing rod to relieve strain while fishing.

Cucullo, U.S. Pat. No. 3,164,343 discloses a gravestone flower support which utilizes a metal band having its longitudinal edges bent over to form longitudinal beads along the top and bottom longitudinal edges and provide a guide for an adjacent band portion, likewise having its longitudinal edges bent over to form complementary beads. A toothed portion of the metal band interlocks with the beaded portion such that they cannot be released from each other. A metal wreath support and a metal conical flower receptacle have U-shaped bends at the rear portions for supporting them on the metal band.

Buckley, U.S. Pat. No. 4,744,537 discloses a sling and bracket type hanging device which can be mounted on a tree. The device utilizes a vertical bracket formed of angle iron which is secured vertically to a tree trunk by an elastic band which encircles the trunk at the lower end of the bracket. An elongate horizontal support affixed to the medial portion of the vertical angle bracket extends horizontally outward therefrom and is supported by a rope sling which is looped around the tree trunk above the elastic band and its attached at its free end to the medial portion of the horizontal support arm.

My previous patent, U.S. Pat. No. 5,301,911, incorporated herein by reference, discloses a portable hanging system for attachment to vertical objects which utilizes several different types of brackets that are attached to a vertical object with a belt and each is designed to support various articles.

My previous patent, U.S. Pat. No. 5,427,344, incorporated herein by reference, discloses a portable hanging shelf for attachment to vertical objects which utilizes brackets that are attached to a vertical object with a belt and are designed to suspend one or more shelf members.

The present invention is distinguished over the prior art in general, and these patents in particular by a portable hook hanging system particularly useful for campers and backpackers that includes one or more hook elements that are releasably connected to a generally vertical object, such as a tree trunk, by a flexible cord or belt for hanging and supporting various articles. In a preferred embodiment, a plurality of hooks along with a rod and several lengths of cord are supplied in a kit and a flexible belt may also be supplied in the kit. Each hook has a generally H-shaped main body portion with first and second U-shaped recess extending transversely across the main body portion with the openings of the U-shaped recesses facing in vertically opposed directions. A flat rectangular tang portion and a flat leg portion are formed on a back side of the main body portion and a vertical slot is formed between the tang portion and main body portion which receives the cord or belt. Shallow slots formed in the inwardly curved surfaces of the U-shaped recesses allow the hook to be connected to the vertical object using a cord. Apertures are formed through the main body portion and leg portion for receiving a cord or the rod. When the hooks are secured, the tang portion and leg portion are firmly engaged against the exterior surface of the vertical object, and the main body portion with the U-shaped recesses is disposed closely adjacent to the vertical object such that various articles may be hung and supported therefrom. The rod is inserted into the apertures for supporting a lantern or other article at its outer end. All the components can be stored in a compact configuration and are easily transported.

SUMMARY OF THE INVENTION

It is therefore an object of the present invention to provide a portable hook hanging system that can be easily and quickly attached to a vertical object such as a tree trunk.

It is another object of this invention to provide a portable hook hanging system which utilizes one or more universal hooks that can be firmly connected to a vertical object and have an outer surface configured to receive various articles to be suspended and supported therefrom.

Another object of this invention is to provide a lightweight portable hook hanging system which can be stored in a small compact package and is transported.

Another object of this invention is to provide a portable hook hanging system having a flexible cord or belt which encircles generally vertical objects of varying diameters, and which will not damage the surface of the object on which it is attached.

Another object of this invention is to provide a portable hook hanging system which is particularly useful for campers and backpackers for hanging a wide variety of camping gear and provisions above the ground and is easily carried in a backpack.

A further object of this invention is to provide a portable hanging system which will eliminate the need to drive nails into trees and other vertical objects for hanging various articles.

A still further object of this invention is to provide a portable hanging system which is simple in construction, economical to manufacture, and is rugged and reliable in use.

Other objects of the invention will become apparent from time to time throughout the specification and claims as hereinafter related.

The above noted objects and other objects of the invention are accomplished by a portable hook hanging system particularly useful for campers and backpackers that includes one or more hook elements that are releasably connected to a generally vertical object, such as a tree trunk, by a flexible cord or belt for hanging and supporting various articles. In a preferred embodiment, a plurality of hooks along with a rod and several lengths of cord are supplied in a kit and a flexible belt may also be supplied in the kit. Each hook has a generally H-shaped main body portion with first and second U-shaped recess extending transversely across the main body portion with the openings of the U-shaped recesses facing in vertically opposed directions. A flat rectangular tang portion and a flat leg portion are formed on a back side of the main body portion and a vertical slot is formed between the tang portion and main body portion which receives the cord or belt. Shallow slots formed in the inwardly curved surfaces of the U-shaped recesses allow the hook to be connected to the vertical object using a cord. Apertures are formed through the main body portion and leg portion for receiving a cord or the rod. When the hooks are secured, the tang portion and leg portion are firmly engaged against the exterior surface of the vertical object, and the main body portion with the U-shaped recesses is disposed closely adjacent to the vertical object such that various articles may be hung and supported therefrom. The rod is inserted into the apertures for supporting a lantern or other article at its outer end. All the components can be stored in a compact configuration and are easily transported.

BRIEF DESCRIPTION OF THE DRAWINGS

FIG. 1 is a perspective view of the portable hook in accordance with the present invention shown from the front and top.

FIG. 2 is a side elevation of the portable hook.

FIG. 3 is a perspective view of the portable hook shown from the rear and bottom.

FIG. 7 is an illustration showing an example of how two hooks may be connected together for supporting various articles.

DESCRIPTION OF THE PREFERRED EMBODIMENT

Figure 4:
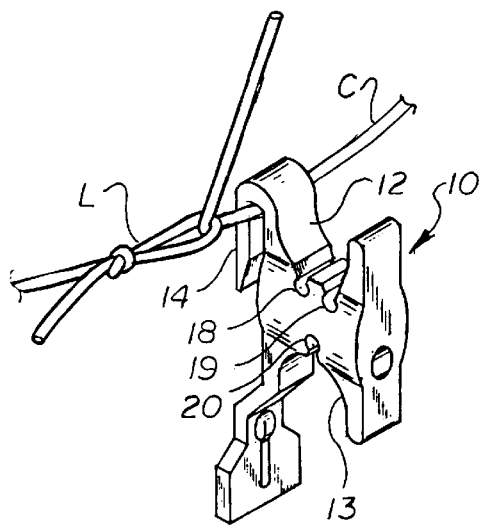
FIGS. 4, 5, and 6, are illustrations showing the use of a cord to secure the hooks to a vertical object.

Referring now to FIGS. 1, 2, and 3, there is shown a portable hook 10 in accordance with a preferred embodiment of the present invention for supporting various articles from generally vertical objects of varying diameters.

The hook 10 is a generally flat rectangular configuration having a generally H-shaped main body portion 11 with a first U-shaped recess 12 and a second inverted U-shaped recess 13 extending transversely across the main body portion with the openings of the U-shaped recesses facing in vertically opposed directions.

A flat generally rectangular tang portion 14 and a flat leg portion 15 are formed on the back side of the main body portion 11. The tang portion 14 adjoins one side of the first U-shaped recess 12 at its upper end and extends vertically downward therefrom in outwardly spaced relation to the main body portion to define a vertical slot 16 therebetween open at one end.

The leg portion 15 extends angularly downward and outward from one side of the second U-shaped recess 13 and terminates in a generally flat rectangular vertical portion 17 spaced a distance beneath the tang portion 14 and generally in vertical alignment therewith.

The slot 16 is of sufficient size to receive a flexible belt or cord that is encircled and fastened around a generally vertical object, such as the trunk of a tree, as described hereinafter. In a preferred embodiment, the vertical portion 17 of the leg portion 15 is wider than the upper portion of the leg portion to provide stability and reduce lateral pivoting movement when the hook is secured to the vertical object.

A first and a second horizontal shallow slot 18 and 19 are formed in the inwardly curved surface of the first U-shaped recess 12. A third horizontal shallow slot 20 may also be formed in the inwardly curved surface of the second U-shaped recess 13. As seen from the side, the slots 18, 19, and 20 have a truncated V-shaped outer opening and a semi-circular inner portion. The slots 18, 19, and 20 are sized and shaped to receive and retain a cord or rope when pressed through the V-shaped outer openings.

The main body 11 of the hook 10 has a flat vertical surface 21 on the front side opposite the back side having the tang portion 14 and the leg portion 15. A circular aperture 22 extends angularly through lower portion of the vertical surface 21.

A keyhole-shaped aperture 23 extends through the flat vertical portion 17 of the leg portion 15. The aperture 23 has a circular upper portion 23A and a narrow vertical slotted portion 23B extending a distance downwardly therefrom. The circular upper portion 23A of the aperture 23 is formed at an angle in axial alignment with the axis of the circular aperture 22 in the vertical surface 21 of the main body. As described hereinafter, the apertures 22 and 23A are sized and shaped to receive a cord or rope or a small diameter rod.

The hooks 10 are designed to be installed on a generally vertical object, such as the trunk of a tree, by using a flexible cord or belt. In a preferred embodiment, a plurality of hooks along with one or more lengths of cord are supplied in a kit. The kit may also include a flexible belt and/or a small diameter elongate rod.

Figure 5:
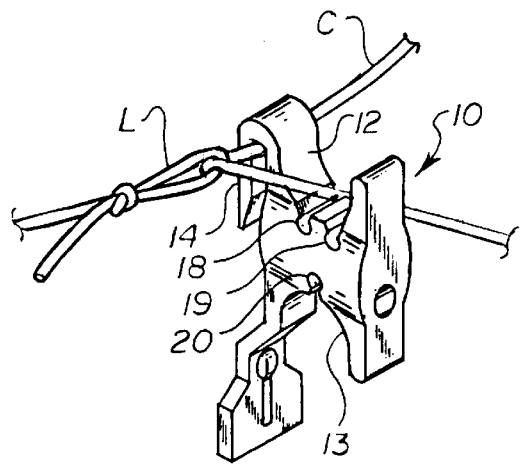
Figure 6:
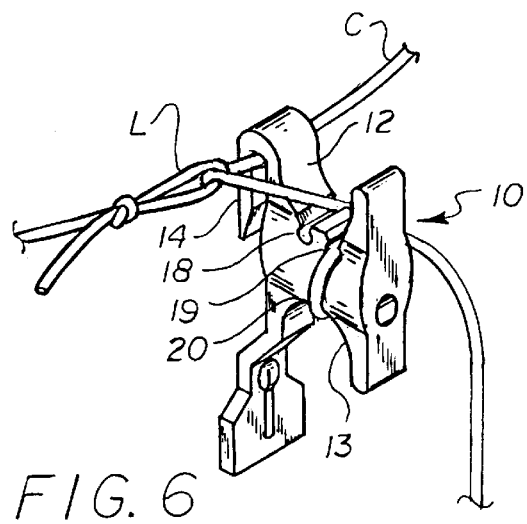

Referring now to FIGS. 4, 5, and 6, the use of a cord C to secure the hooks 10 to a vertical object such as the trunk of a tree will be described. A loop L is formed in one end of a length of cord C. The cord C is encircled around the tree trunk and the free end of the cord is passed through the loop L.

The tang 14 of one hook 10 is placed onto the cord C adjacent to the loop L such that the cord is received in the slot 16 and the tang 14 is between the exterior surface of the tree trunk and the cord. The free end of the cord C is then pulled laterally away from the loop L to tighten the cord around the trunk (FIG. 4).

The portion of the cord extending away from the loop is placed into the first U-shaped recess 12, pulled downwardly into the first horizontal slot 18 in the curved surface of the first U-shaped recess 12 (FIG. 5), wrapped around the lateral side of the hook and pulled upwardly into the third horizontal slot 20 in the curved surface of the second U-shaped recess 13, and then wrapped back over and pulled downwardly into the second horizontal slot 19 in the curved surface of the first U-shaped recess 12 (FIG. 6). This secures the hook and the cord to the trunk and prevents the cord from becoming loosened accidentally. After the first hook has been secured by the cord, additional hooks may be placed onto the encircled portion of the cord C in circumferentially spaced relation by simply pushing their tang portion 14 onto the cord such that the cord is received in the upper portion of the vertical slot 16 and the tang is gripped between the exterior surface of the tree trunk and the cord.

The hooks may also be secured to the vertical object, such as the tree trunk, by a flexible belt having a buckle, latch, or other conventional fastener elements. In this example, the flexible belt is encircled and tightly fastened around the tree trunk. As many hooks as desired are may be placed onto the belt in circumferentially spaced relation by simply pushing their tang portion 14 onto the encircled belt such that the belt is received in the vertical slot 16 and the tang is gripped between the exterior surface of the tree trunk and the inner surface of the belt.

When the hooks are secured by the cord or belt, the tang portion 14 and vertical portion 17 of the leg portion 15 of the hooks are firmly engaged against the exterior surface of the trunk, and the main body portion 11 with the first and second U-shaped recesses 12 and 13 is disposed radially outward and closely adjacent to the vertical object such that various articles may be hung and supported therefrom.

FIG. 7 shows an example of how two hooks may be connected together for supporting various articles. In this example, a first hook 10A is secured to the vertical object, such as the tree trunk, by a flexible belt B as described above. A short length of cord C having a knot at each end is passed through the circular portion 23A of the keyhole-shaped aperture 23 in the vertical portion 17 of the leg portion 15 of the first hook 10A and pulled downwardly into the vertical slot portion 23B to secure one end of the cord therein. The knotted free end of the cord is passed through the circular portion 23A of an inverted second hook 10B, and the cord is pulled upwardly into the slot 23B of the second hook. The free end of the cord is then placed into one of the horizontal slots 18 or 19 in the curved surface of the first U-shaped recess 12 of the first hook 10A and pulled downwardly to secure the free end of the cord. Alternatively, the free end of the cord may be wrapped clockwise or counterclockwise around the opposed U-shaped surfaces 12 and 13, as described above to secure the free end of the cord such that the second hook 10B is at the desired height above the ground.

Figure 8:
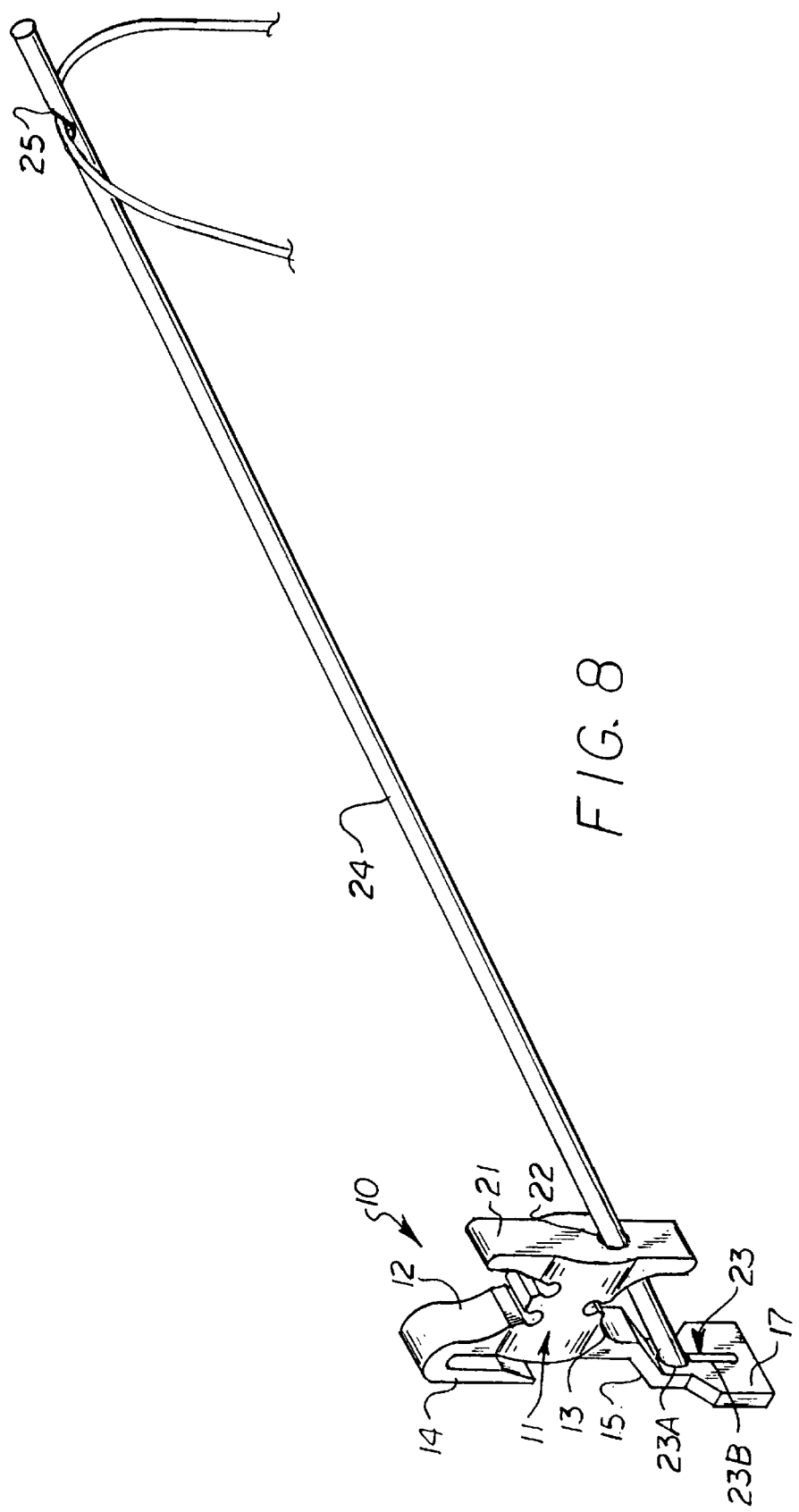
FIG. 8 is an illustration showing a hook being used to support a rod that may be used to support a lantern or other article above the ground.

As stated above, a rod 24 may be provided along with a plurality of the hooks in a kit. FIG. 8 shows how the rod 24 may be used with a hook to support a lantern or other object above the ground. A preferred rod 24 is formed of metal, such as aluminum, approximately ¼" in diameter and approximately 12" in length and has a notch 25 formed a short distance from. In this example, a hook 10 is secured to the vertical object, such as the tree trunk, by a flexible cord or belt as described above. The un-notched end of the rod 24 is passed through the aperture 22 in the vertical surface 21 of the main body 11 and received in the circular portion 23A of the keyhole-shaped aperture 23 in the vertical portion 17 of the leg portion 15. The handle of the lantern is then placed in the notch 25 at the outer end of the rod 24. Other objects may also be supported from the outer end of the rod.

Figure 9:
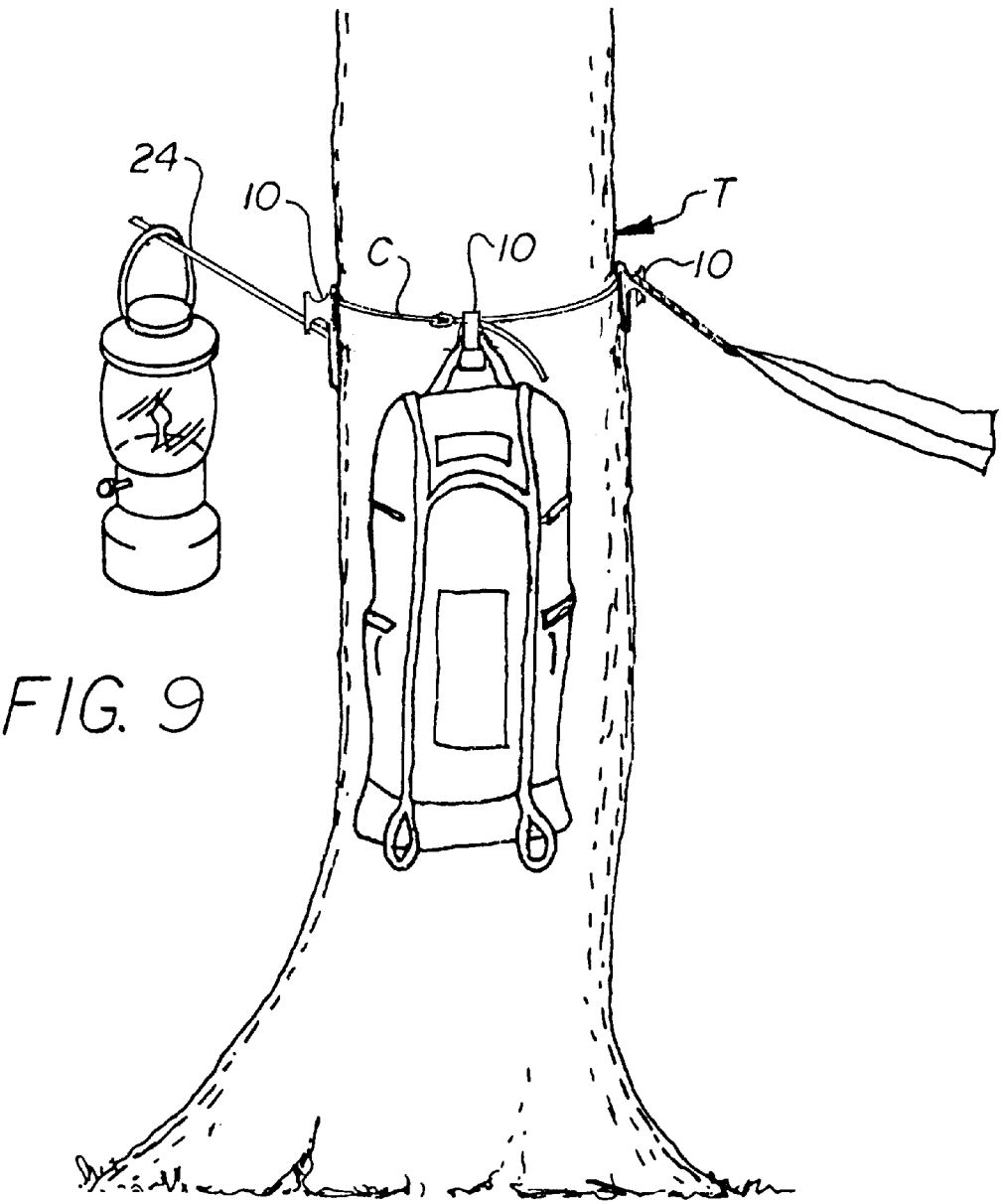
FIG. 9 is a perspective view of the portable hook hanging system installed on the trunk of a tree and supporting various articles from the hook and rod members.

As illustrated in FIG. 9, the present hook and hanging system is particularly useful for campers, hikers, and backpackers, and allows the user to hang and store various articles above the ground such as; backpacks, hiking boots, hammocks, lanterns, bags of food, water jugs, etc.

While this invention has been described fully and completely with special emphasis upon a preferred embodiment, it should be understood that within the scope of the appended claims the invention may be practiced otherwise than as specifically described herein.

I claim:

1. A portable hook for supporting various articles from generally vertical objects of varying diameters comprising:

a generally flat rectangular hook having a main body portion with a flat vertical surface on a front side of said main body portion and a U-shaped recess extending transversely across said main body portion with an upwardly facing opening;

an aperture through said flat vertical surface extending from a front side to a back side thereof sized and shaped to allow passage of a first end of a rod;

at least one horizontal shallow slot transversing an inwardly curved surface of said U-shaped recess sized and shaped to receive a cord or rope when pressed therein;

a flat vertical tang portion and a flat leg portion on a back side of said main body portion;

said vertical tang portion adjoining one side of said U-shaped recess and extending vertically downward therefrom in generally parallel closely spaced relation to said main body portion to define a vertical slot therebetween open at one end;

said flat leg portion extending downwardly and outwardly from said main body portion and terminating in a generally flat lower leg portion spaced beneath said tang portion;

an aperture through said flat lower leg portion extending from a front side to a back side thereof sized and shaped to receive a cord, rope or the rod first end;

said vertical tang portion and said flat lower leg portion adapted to be engaged against an exterior surface of a generally vertical object by a flexible cord or belt received in said slot and encircled and fastened around the vertical object with said main body portion and said U-shaped recess disposed closely adjacent to the exterior surface of the vertical object to hang and support various articles therefrom and said aperture through said flat lower leg portion is in axial alignment with said aperture in said flat vertical surface whereby various articles may be supported from a second end of the rod when the rod first end is passed through said aperture in said flat vertical surface and received in said aperture in said flat lower leg portion.

2. The portable hook according to claim 1, wherein said main body portion is a generally H-shaped configuration with a first U-shaped recess and a second U-shaped recess extending transversely across said main body portion with openings facing in vertically opposed direction;

said vertical tang portion adjoins one side of said first U-shaped recess and extends vertically downward therefrom in generally parallel spaced relation to said main body portion to define a vertical slot therebetween open at one end;

said flat leg portion extends downwardly and outwardly from one side of said second U-shaped recess and terminates in said generally flat lower leg portion spaced beneath said tang portion; and said main body portion with said first and second U-shaped recesses adapted to be disposed closely adjacent to the vertical object to hang and support various articles therefrom when said vertical tang and said flat lower leg portion are engaged against the exterior surface of the vertical object.

3. A compact portable hanging system for campers and backpackers for supporting various articles from generally vertical objects of varying diameters comprising:

a plurality of generally flat rectangular hook members each having a generally H-shaped main body portion with a U-shaped recess extending transversely across said main body portion with an upwardly facing opening, at least one horizontal shallow slot transversing an inwardly curved surface of said U-shaped recess sized and shaped to receive a cord or rope when pressed therein, a flat vertical tang portion and a flat leg portion on a back side of said main body portion, said vertical tang portion adjoining one side of said U-shaped recess and extending vertically downward therefrom in generally parallel closely spaced relation to said generally H-shaped main body portion to define a vertical slot therebetween open at one end, and said flat leg portion extending downwardly and outwardly from said main body portion and terminating in a generally flat lower leg portion spaced beneath said vertical tang portion;

each said hook having a flat vertical surface on a front side of said main body portion, an aperture extending through said flat vertical surface extending from a front side to a back side thereof sized and shaped to allow passage of a rod first end, and an aperture extending through said flat lower leg portion in axial aliment with said aperture in said flat vertical surface sized and shaped to receive a cord, rope or said rod first end; and at least one elongate flexible member of sufficient length and size to be encircled and fastened around a vertical object and to be received in said vertical slot;

said vertical tang portion and said flat lower leg portion adapted to be engaged against an exterior surface of a generally vertical object by said encircled flexible member received in said slot with said main body portion and said U-shaped recess disposed closely adjacent to the exterior surface of the vertical object to hang and support various articles therefrom and various articles may be supported from a second end of the rod when its said first end is passed through said aperture in said flat vertical surface and received in said aperture in said flat lower leg portion.

4. The portable hanging system according to claim 3, wherein each said hook main body portion is a generally H-shaped configuration with a first U-shaped shaped recess and a second U-shaped recess extending transversely across said main body portion with openings facing in vertically opposed direction;

said vertical tang portion adjoins one side of said first U-shaped recess and extends vertically downward therefrom in generally parallel closely spaced relation to said main body portion to define a vertical slot therebetween open at one end;

said flat leg portion extends downwardly and outwardly from one side of said second U-shaped recess and terminates in said generally flat lower leg portion spaced beneath said vertical tang portion; and said main body portion with said first and second U-shaped recesses adapted to be disposed closely adjacent to the exterior surface of the vertical object to hang and support various articles therefrom when said vertical tang and said flat lower leg portion are engaged against the exterior surface of the vertical object.

5. The portable hanging system according to claim 3, wherein said at least one elongate flexible member comprises a cord of sufficient length and size to be encircled around a vertical object and secured in said encircled condition.

6. The portable hanging system according to claim 3, wherein said at least one elongate flexible member comprises a belt of sufficient length and size to be encircled around a vertical object including fastener means for securing said belt in said encircled condition.

7. A compact portable hanging system for campers and backpackers for supporting various articles from generally vertical objects of varying diameters comprising:

a plurality of generally flat rectangular hook members each having a generally H-shaped main body portion with a U-shaped recess extending transversely across said main body portion with an upwardly facing opening, at least one horizontal shallow slot transversing an inwardly curved surface of said U-shaped recess sized and shaped to receive a cord or rope when pressed therein, a flat vertical tang portion and a flat leg portion on a back side of said main body portion, said vertical tang portion adjoining one side of said U-shaped recess and extending vertically downward therefrom in generally parallel closely spaced relation to said Generally H-shaped main body portion to define a vertical slot therebetween open at one end, and said flat leg portion extending downwardly and outwardly from said main body portion and terminating in a generally flat lower leg portion spaced beneath said vertical tang portion;

a small diameter elongate rod member having a first end and a second end;

each said hook having a flat vertical surface on a front side of said main body portion, an aperture through said flat vertical surface sized and shaped to allow passage of said rod first end, and an aperture through said flat lower leg portion sized and shaped to receive said rod first end whereby said rod first end is installed through said aperture in said flat vertical surface and received in said aperture in said flat lower leg portion with its said second end extending outwardly therefrom to support various articles thereon; and at least one elongate flexible member of sufficient length and size to be encircled and fastened around a vertical object and to be received in said vertical slot;

said vertical tang portion and said flat lower leg portion adapted to be engaged against an exterior surface of a generally vertical object by said encircled flexible member received in said slot with said main body portion and said U-shaped recess disposed closely adjacent to the exterior surface of the vertical object to hang and support various articles therefrom.

* * * * *